(12) United States Patent
Halula

(10) Patent No.: US 8,887,421 B1
(45) Date of Patent: Nov. 18, 2014

(54) MULTI-IMAGE PERSONALIZED LICENSE PLATE DISPLAY APPARATUS

(76) Inventor: Robert Halula, Boca Raton, FL (US)

( * ) Notice: Subject to any disclaimer, the term of this patent is extended or adjusted under 35 U.S.C. 154(b) by 129 days.

(21) Appl. No.: 13/596,864

(22) Filed: Aug. 28, 2012

Related U.S. Application Data

(63) Continuation-in-part of application No. 12/790,832, filed on May 30, 2010, now Pat. No. 8,250,793.

(60) Provisional application No. 61/182,747, filed on May 31, 2009.

(51) Int. Cl.
*G09F 11/02* (2006.01)
*G09F 7/00* (2006.01)
*G09F 13/02* (2006.01)
*G09F 7/02* (2006.01)
*B60Q 9/00* (2006.01)

(52) U.S. Cl.
CPC .. *G09F 11/02* (2013.01); *B60Q 9/00* (2013.01)
USPC .................. 40/503; 40/200; 40/201; 40/202; 40/203; 40/204; 40/205; 40/206; 40/207; 40/208; 40/209; 40/210; 40/211

(58) Field of Classification Search
CPC ........................................ G09F 11/02
USPC ............................................ 40/503, 200–211
See application file for complete search history.

(56) References Cited

U.S. PATENT DOCUMENTS

| | | | | | |
|---|---|---|---|---|---|
| 2,635,227 | A | * | 4/1953 | Liotta | 340/488 |
| 5,566,384 | A | * | 10/1996 | Chien | 362/486 |
| 8,646,194 | B2 | * | 2/2014 | Podd | 40/578 |
| 2004/0093777 | A1 | * | 5/2004 | Park | 40/503 |
| 2007/0199216 | A1 | * | 8/2007 | Atkinson | 40/503 |

* cited by examiner

*Primary Examiner* — Syed A Islam
(74) *Attorney, Agent, or Firm* — Allen D. Hertz, P.A.; Allen D. Hertz

(57) ABSTRACT

A multi-image license plate assembly having a series of horizontally disposed rotating display members operably controlled by a rotational drive mechanism. The drive mechanism can be a series of gears, pulleys, belts, chains, a worm gear assembly, or other means. The horizontally disposed rotating display members rotated about a horizontal axis. The rotating display members preferably have three image surfaces. An image is segmented, with each segment applied to a respective image surface of each of the display members, such that when the image surfaces are aligned, the complete image is displayed. The image can be applied directly to the rotating member or applied to an insert. An adapter mount is provided for fastening the multi-image license plate assembly to a vehicle.

21 Claims, 16 Drawing Sheets

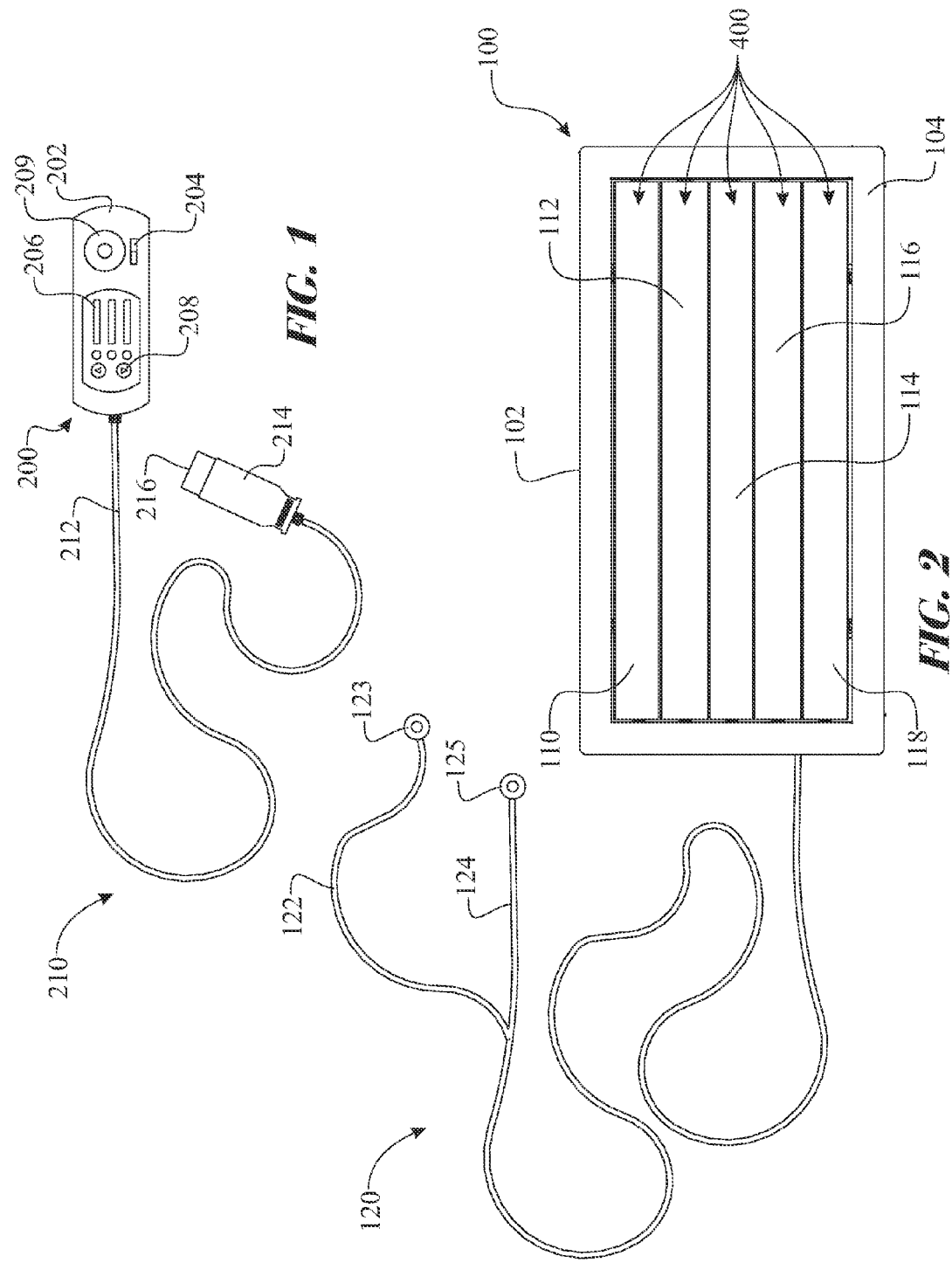

MULTI-IMAGE PERSONALIZED LICENSE PLATE DISPLAY APPARATUS

CROSS REFERENCE TO RELATED APPLICATIONS

This application is a Continuation-In-part of U.S. Non-Provisional application Ser. No. 12/790,832 filed May 30, 2010, issuing as U.S. Pat. No. 8,250,793 on Aug. 28, 2012, which claims benefit of Provisional U.S. Patent Application Ser. No. 61/182,747, filed May 31, 2009, the contents of which are incorporated herein by reference into the present application.

FIELD OF THE INVENTION

The present disclosure generally relates to a personalized license plate. More particularly, the present disclosure relates to a personalized license plate having a plurality of images that can be remotely changed via a plurality of rotating members.

BACKGROUND OF THE INVENTION

It has been customary for vehicle owners to personalize their vehicles by installing custom license plates on the front of their vehicles. These custom license plates provide a means for expressing the person's interests, tastes, associations, businesses, and the like. Examples include a university plate, a business advertisement, a hobby association, and the like. The current configuration secures the single image license plate to the vehicle. This configuration limits the license plate to a single image.

Therefore, what is desired is a personalized license plate allowing the occupants to change the image as desired.

SUMMARY OF THE INVENTION

The present disclosure is generally directed to a multi-image license plate assembly providing a vehicle occupant the ability to change the presented image. The multi-image license plate comprising a plurality of rotating members having a plurality of image surfaces. The series of the rotating members rotate in a synchronized fashion, changing the presented image from a first image to a successive image. The plurality of images can be applied to the rotating members in any of a variety of methods.

In some embodiments, the multi-image license plate assembly may include:

an assembly frame having an image presentation side, which is sized approximate to that of a standard license plate;

a series of rotating display members, each rotating display member having a rotational axis disposed along a longitudinal center of each rotating display member;

each rotating display member being disposed horizontally within said assembly frame;

each rotating member having at least two image surfaces, wherein a lower image surface edge abuts an upper image surface edge of an adjacent image surface to provide a planar surface finish;

at least one visual image divided into segments with each segment disposed upon a respective image surface of the series of rotating display members, presenting the visual image when the rotating display members are positioned accordingly;

a rotational drive mechanism being operatively engaged to the series of rotating display members for intermittently rotating the series of rotating display members in a synchronized fashion for presenting a series of different images; and a mount for fastening said assembly frame to a license plate mount of a vehicle.

In another aspect, the rotating display members comprise three equal image surfaces forming a triangular shaped cross section.

In still another aspect, the rotational drive mechanism is a stepper motor.

In yet another aspect, the image is attached to the image surface via an adhesive.

In a still further aspect, the image is sized covering the entire viewing surface, adhered, then sliced along the seam between each of two adjacent image surfaces.

In another aspect, the image is placed upon an image insert, which is mechanically secured to a display frame member. The image can be printed, painted, adhered to, and the like, upon an image surface or an insert applied to the rotating display member.

In a still further aspect, the image is placed upon an image insert, which is mechanically secured to a display frame member via a sliding assembly, a snap assembly, a magnetic assembly, and the like.

In yet another aspect, the multi-image license plate assembly further comprises a remote control for remotely rotating the assembly between a displayed image and an adjacent image.

While in another aspect, the drive mechanism includes a motor segmented gear comprising a motor segmented gear toothed section and a motor segmented gear tooth-free section, a rotational member gear comprising a series of rotational member gear teeth disposed about the circumference of the rotational member gear. The rotational member gear being operationally engaged with the drive gear, wherein the rotational member gear rotates when the motor segmented gear toothed section engages with the rotational member gear teeth and maintains the rotational member assembly in a display position when the motor segmented gear tooth-free section passes across the rotational member gear teeth.

And in another aspect, a drive gear rotational member stabilizing cam is disposed upon a distal end of the motor segmented gear, the stabilizing cam having a stationary display broad radius cam section and a display rotating narrow cam section about a circumference and a stabilizing surface provided as a distal surface; and a three position display stabilizing cam disposed upon a distal end of the rotational member gear having three equilateral stabilizing cam engaging edge surfaces, wherein the stabilizing cam engaging edge surfaces are supported by the stabilizing surface to maintain the rotating member in a display orientation and wherein the three position display stabilizing cam rotates when aligned with the display rotating narrow cam section.

In yet another aspect, the rotating members can be vertically oriented.

In yet another aspect, the license plate assembly further comprises an operational control circuit that monitors the voltage level of the power source. When the power source voltage level meets or exceeds a lower limit, the operational control circuit deactivates the apparatus.

In yet another aspect, the license plate assembly further comprises an operational control circuit that monitors the exposure of the assembly to any vibrational motion. The operational control circuit monitors the frequency of any vibration over a predetermined span of time. When the assembly is exposed to a stable environment (fails to identify any vibrational motion) over the predetermined time span, the control circuit places the assembly into a sleep mode.

With yet another aspect providing a remote control that utilizes either wired or wireless communication between the remote control and the multi-image license plate assembly.

BRIEF DESCRIPTION OF THE DRAWINGS

The invention will now be described, by way of example, with reference to the accompanying drawings, where like numerals denote like elements and in which:

FIG. 1 illustrates an exemplary illustration of a remote control apparatus for remotely rotating the assembly between a displayed image and an adjacent image;

FIG. 2 illustrates an elevation front view of an exemplary embodiment of a multi-image license plate assembly;

DETAILED DESCRIPTION OF THE INVENTION

Figure 3:
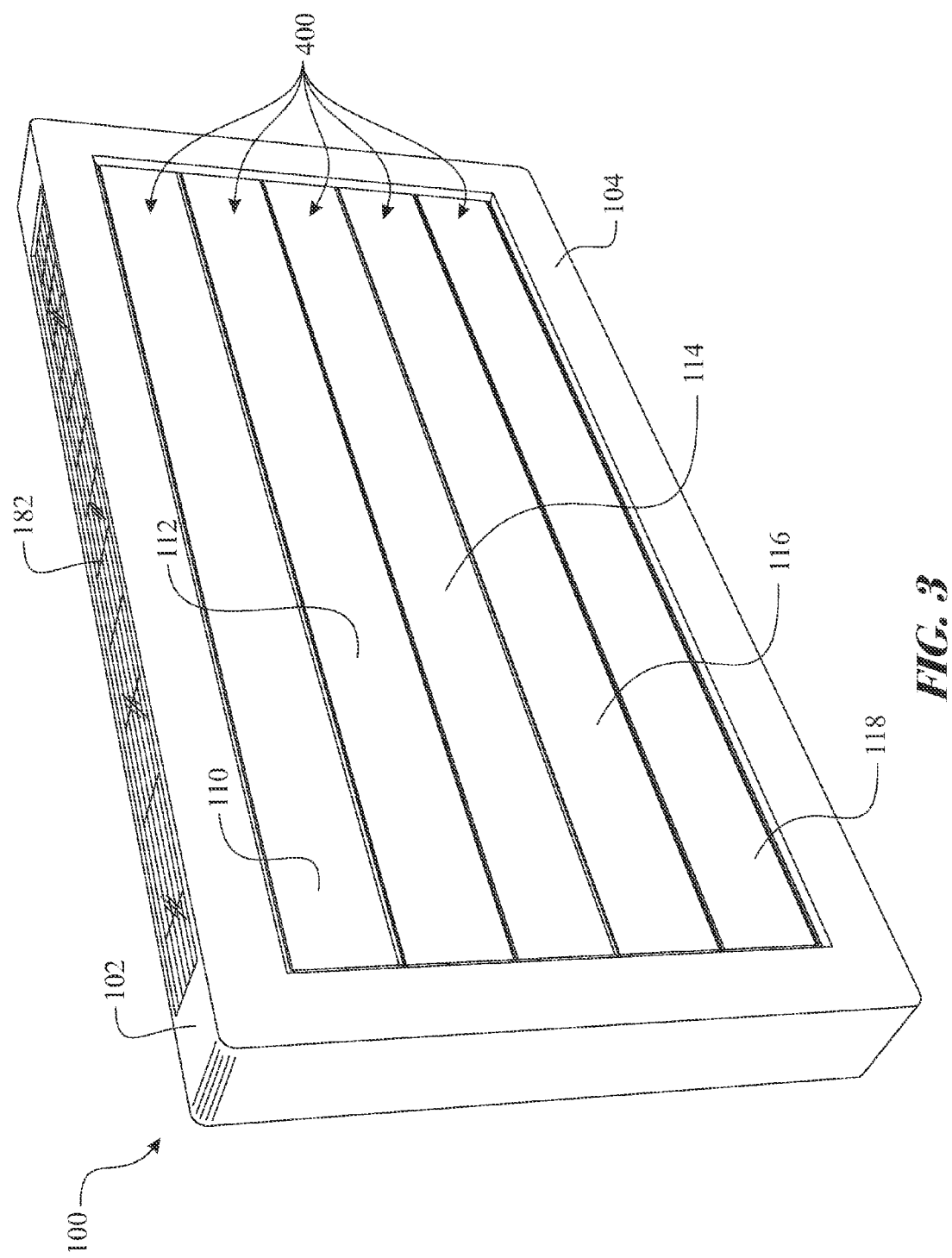
FIG. 3 illustrates a perspective front view of the illustrative embodiment of the multi-image license plate assembly presented in FIG. 2.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
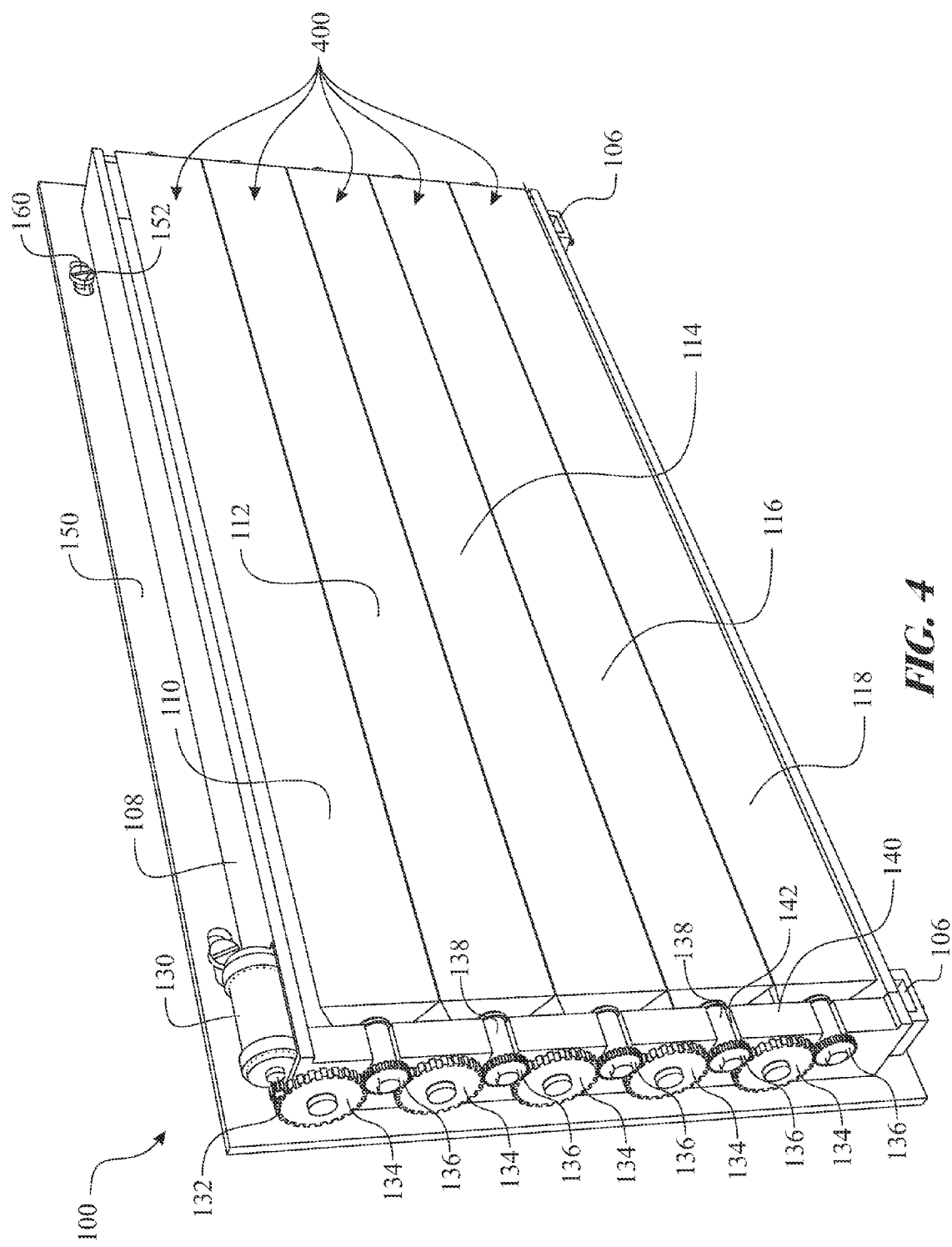
FIG. 4 illustrates a perspective front view of the functional components assembled within an inner frame based upon the illustrative embodiment of the multi-image license plate assembly presented in FIG. 2.
Figure 5:
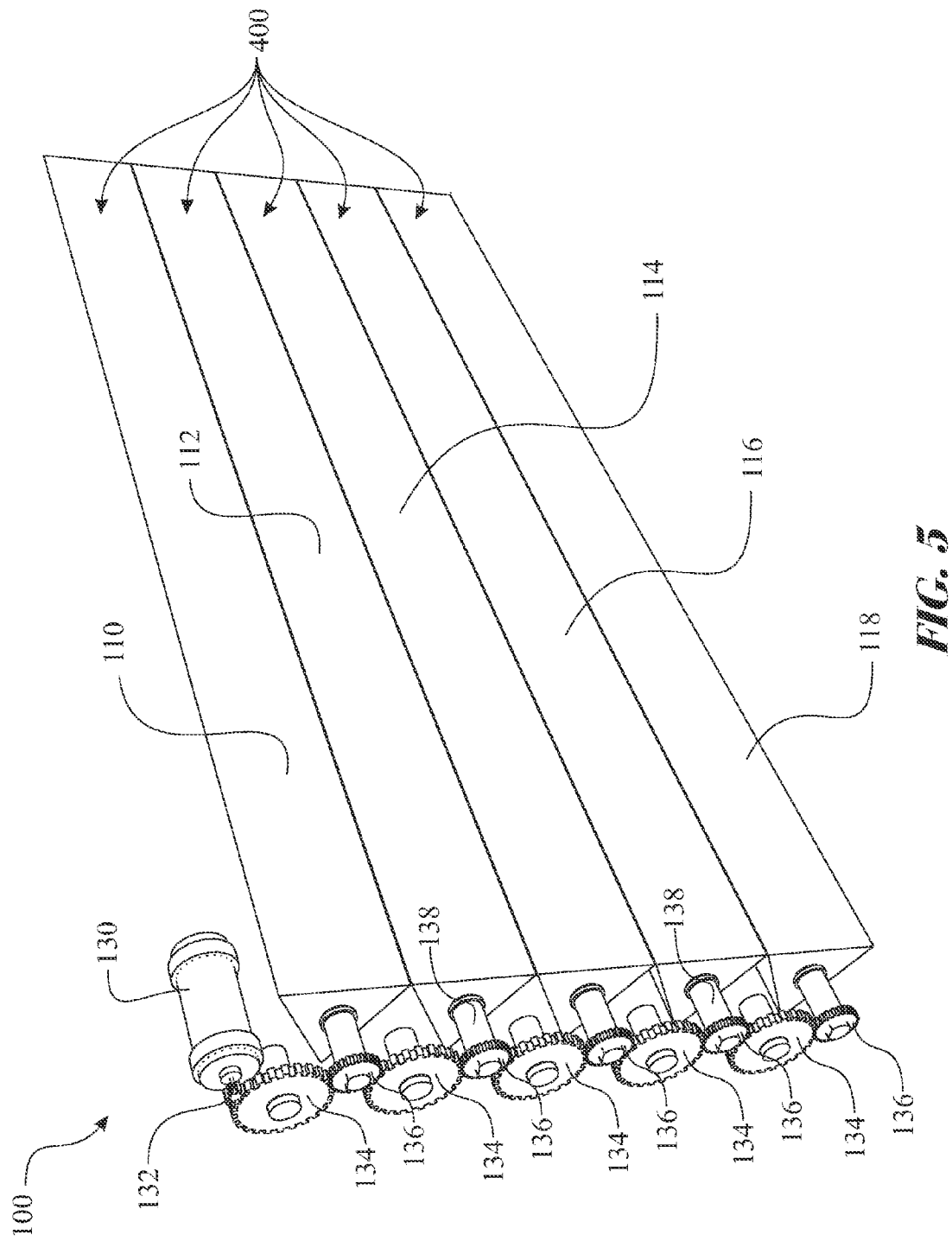
FIG. 5 illustrates a perspective front view of the functional components removed from the inner frame of the multi-image license plate assembly presented in FIG. 2.

The present disclosure is generally directed to a multi-image license plate assembly 100 as illustrated in FIGS. 2 through 5. The multi-image license plate assembly 100 includes an assembly front cover 104 assembled to an assembly housing 102, enclosing the functional components. An inner frame 108, including a shaft assembly supporting subsection 140, provides an assembly support frame for the functional components as illustrated in FIG. 4. The assembly housing 102 can be formed about the perimeter of the inner frame 108, as part of the assembly front cover 104, or as a separate component. A series of rotational member shaft slots 142 can be formed within a shaft assembly supporting subsection 140 of the inner frame 108. A series of rotational member assemblies 400 are rotationally assembled to the shaft assembly supporting subsection 140 by placing an axle-like feature, such as a rotational member axle 144 and rotational member gear shaft bushing 138, into each of the respective rotational member shaft slot 142. The rotational member gear shaft bushing 138 is secured within the rotational member shaft slot 142 via a plate (or similar) placed along the exposed edge of the shaft assembly supporting subsection 140. One such enclosure can be incorporated into the assembly housing 102 or assembly front cover 104 or can be a separate plate fastened to the assembly housing 102.

Figure 7:
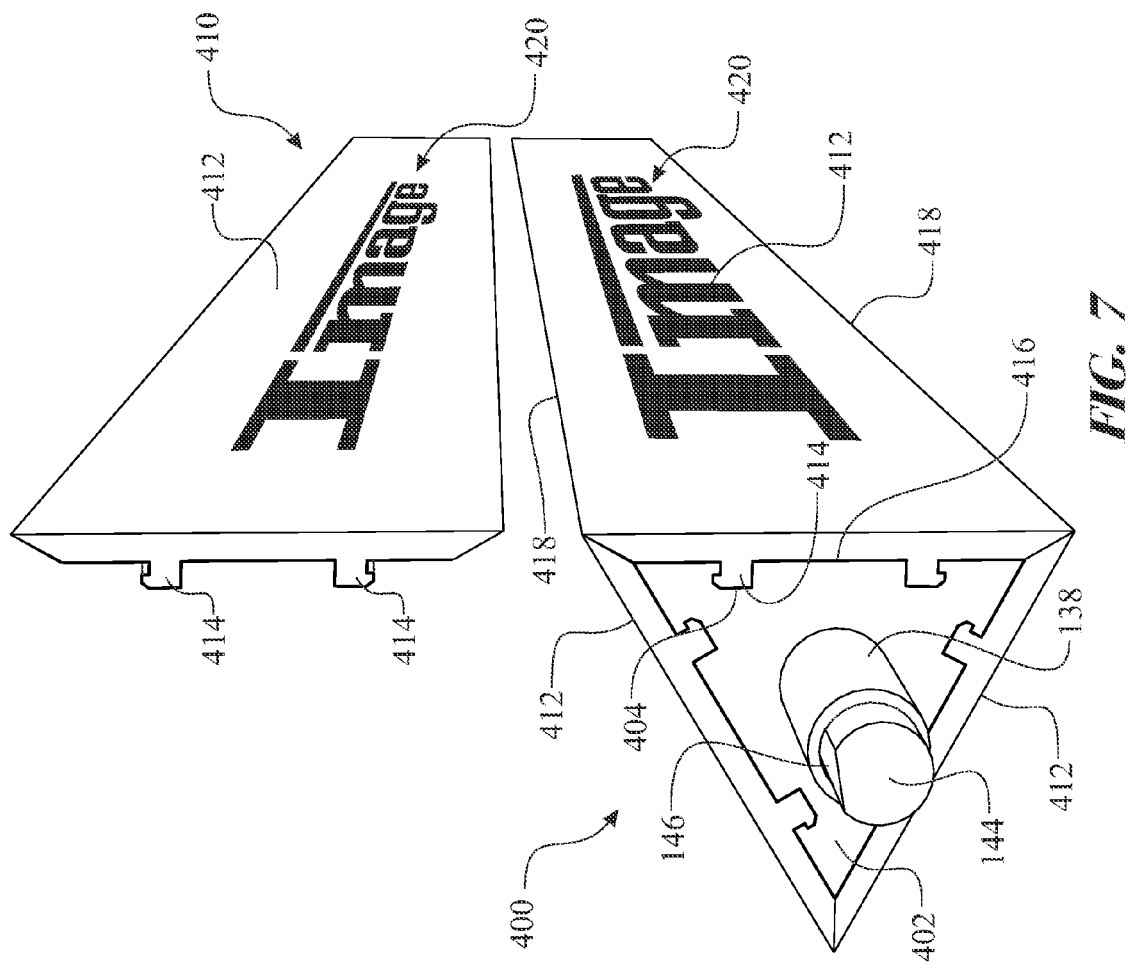
FIG. 7 illustrates a perspective view of an exemplary embodiment of a rotating display member assembly for use with the multi-image license plate assembly of FIG. 2.

An exemplary embodiment of the rotational member assembly 400 is detailed in FIG. 7. The rotational member assembly 400 includes a rotational member axle 144 assembled having a rotational axis aligned with a longitudinal centerline of the rotational member assembly 400. A keying feature, such as a knurled axle key surface 146, is preferably formed within the rotational member axle 144 ensuring a rotational member gear 136 (FIG. 4) remains properly registered to the rotational member assembly 400. A rotational member gear shaft bushing 138 can be provided for reducing friction, being slipped over the rotational member axle 144. The rotational member assembly 400 is preferably formed having a rotational display frame member 402 with three rotational member image receiving surfaces 416. The rotational member image receiving surfaces 416 are formed being concentric about a longitudinal centerline. The rotational member image receiving surface 416 can be a planar surface or incorporate features for coupling an image insert 410. An image such as image 420 can be applied directly to the rotational member image receiving surface 416 or onto an image surface 412 of the image insert 410. The image insert 410 is then assembled onto the rotational member image receiving surface 416 (as illustrated). In the illustrated example, the image insert 410 includes a pair of image insert securing tabs 414, which are slideably assembled into a respective pair of insert coupling receptacle 404 formed within the rotational member image receiving surface 416.

The series of rotational member assemblies 400 are assembled in a parallel, horizontal configuration, abutting adjacent image surface mating edge 418 (FIG. 7). A segment of the image is applied to each of the respective rotational member assembly 400 of the series. In the exemplary embodiment, the multi-image license plate assembly 100 includes five (5) rotational member assemblies 400, including a upper rotational member 110, a second rotational member 112, a center rotational member 114, a fourth rotational member 116, and a lower rotational member 118. A plurality of torque translation gears 134 are assembled to the multi-image license plate assembly 100 by placing an axle of the torque translation gears 134 into holes provided within the shaft assembly supporting subsection 140. The rotational member assemblies 400 are then assembled to the multi-image license plate assembly 100 by placing rotational member gear shaft bushings 138 over each of a gear end and a free spinning end of the rotational member axle 144. A rotational member gear 136 is assembled to the gear end of the rotational member assembly 400, and the rotational member assemblies 400 is placed into the rotational member shaft slot 142. Teeth of the rotational member gear 136 engage with teeth of the torque translation gear 134. Each of the rotational member assemblies 400 is inserted into the respective rotational member shaft slot 142. The rotational member assemblies 400 are held in proper registration respective to the complete series of rotational member assemblies 400 ensuring the image segments remain in registration during the rotating process. The series of gears 134, 136 create a single rotational drive system engaging with a motor gear 132 attached to a motor 130. The motor gear 132 can be a single gear or a series of gears forming a torque converter. The motor 130 is mounted to the inner frame 108 (as shown) or the housing rear surface and mounting flange 150. The motor 130 is preferably a DC driven stepper motor. Although the exemplary embodiment utilizes a series of five (5) rotational member assemblies 400, it is recognized that any reasonable number of rotational member assemblies 400 can be used. A sensor, a stepper motor counting sequence, and the like can be deployed to determine when the series of rotational member assemblies 400 are properly rotated placing the edges 418 into proper alignment.

Power is preferably provided to the multi-image license plate assembly 100 via a power cabling 120 coupled to the vehicles power system. The power cabling 120 includes a positive power cable 122 having a positive power terminal connector 123 and a negative power cable 124 having a negative power terminal connector 125. Although the preferred design utilizes the vehicle's power, it is recognized the multi-image license plate assembly 100 can be powered via a portable power source such as batteries 180 (FIGS. 8 and 9), solar power 182 (FIGS. 3 and 6), capacitors, wind generated power, and the like. The portable power source can be incorporated within the primary assembly, housed in a separate battery box mounted on the vehicle, or mounted in any other reasonable manner respective to the form factor of the power supply. A signal controller can be included, such as the exemplary embodiment illustrated in FIG. 1, for providing operational control of the multi-image license plate assembly 100. The signal controller includes an operational control assembly 200, which communicates with the multi-image license plate assembly 100 via a signal cable assembly 210. The operational control assembly 200 comprises a control assembly housing 202 having a power button 204, a series of position indicators 206, and a rotational direction control 208. The operational control assembly 200 can be used to complete at least one of the following functions:

a. Activating the multi-image license plate assembly, b. Deactivating the multi-image license plate assembly, c. Directing a rotation of said series of rotating display members to sequentially advance said displayed image to a subsequent image, d. Controlling a direction of rotation of said series of rotating display members to sequentially advance said displayed image to a subsequent image in one of a clockwise rotation and a counterclockwise rotation, e. Establishing a span of time between an automated sequential rotation of said series of rotating display members to sequentially advance said displayed image to a subsequent image, and f. Adjusting a span of time between an automated sequential rotation of said series of rotating display members to sequentially advance said displayed image to a subsequent image.

An optional timer switch 209 can be incorporated, allowing the user to program the multi-image license plate assembly 100 to automatically change the displayed image based upon the programmed time delay. The timer can be set with a single time span or a plurality of time spans. The controlling signal is communicated via the signal cable assembly 210 to the multi-image license plate assembly 100. The signal cable assembly 210 comprises a signal cable 212 in communication with the operational control assembly 200 on a first end and having a signal connector housing 214 on the opposite end. A signal connector 216 is provided within the signal connector housing 214 for electrically connecting the operational control assembly 200 to a mating connector on the multi-image license plate assembly 100.

Figure 8:
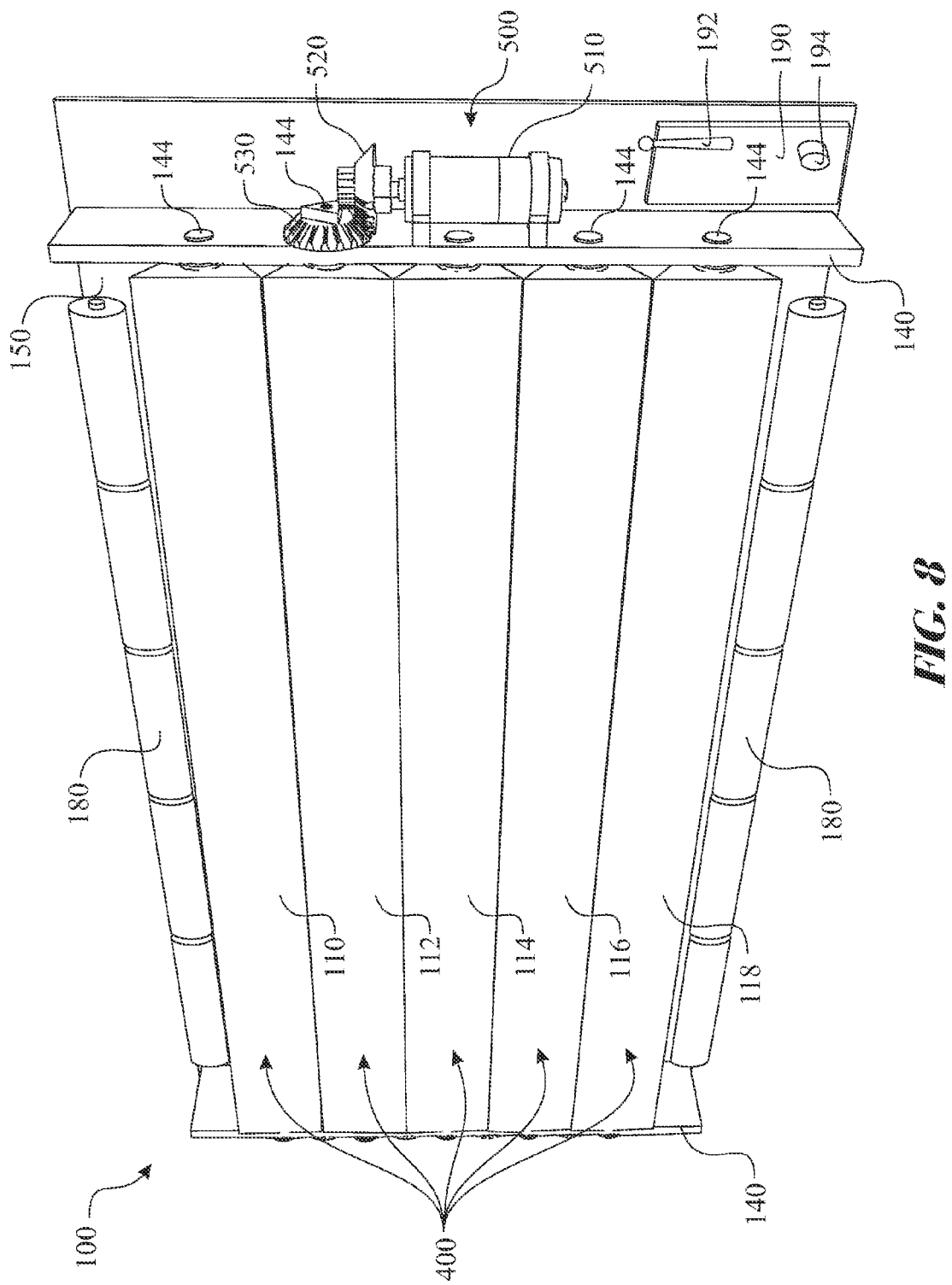
FIG. 8 illustrates a perspective front view of the functional components assembled within the inner frame based focusing on an incorporated alternate drive interface.
Figure 9:
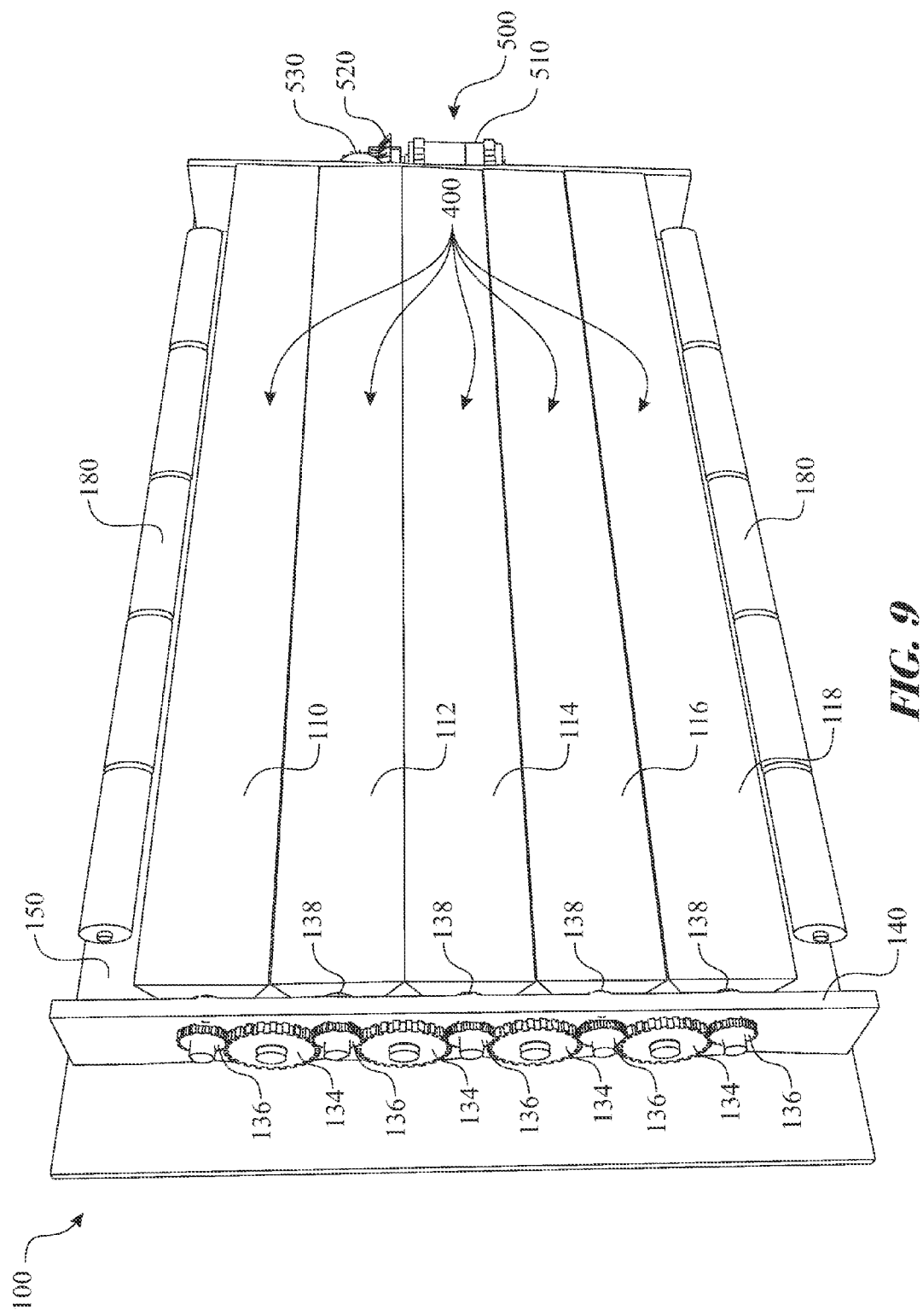
FIG. 9 illustrates a perspective front view of the functional components assembled within the inner frame based focusing on a gear drive train operationally controlled by the alternate functional drive mechanism.
Figure 10:
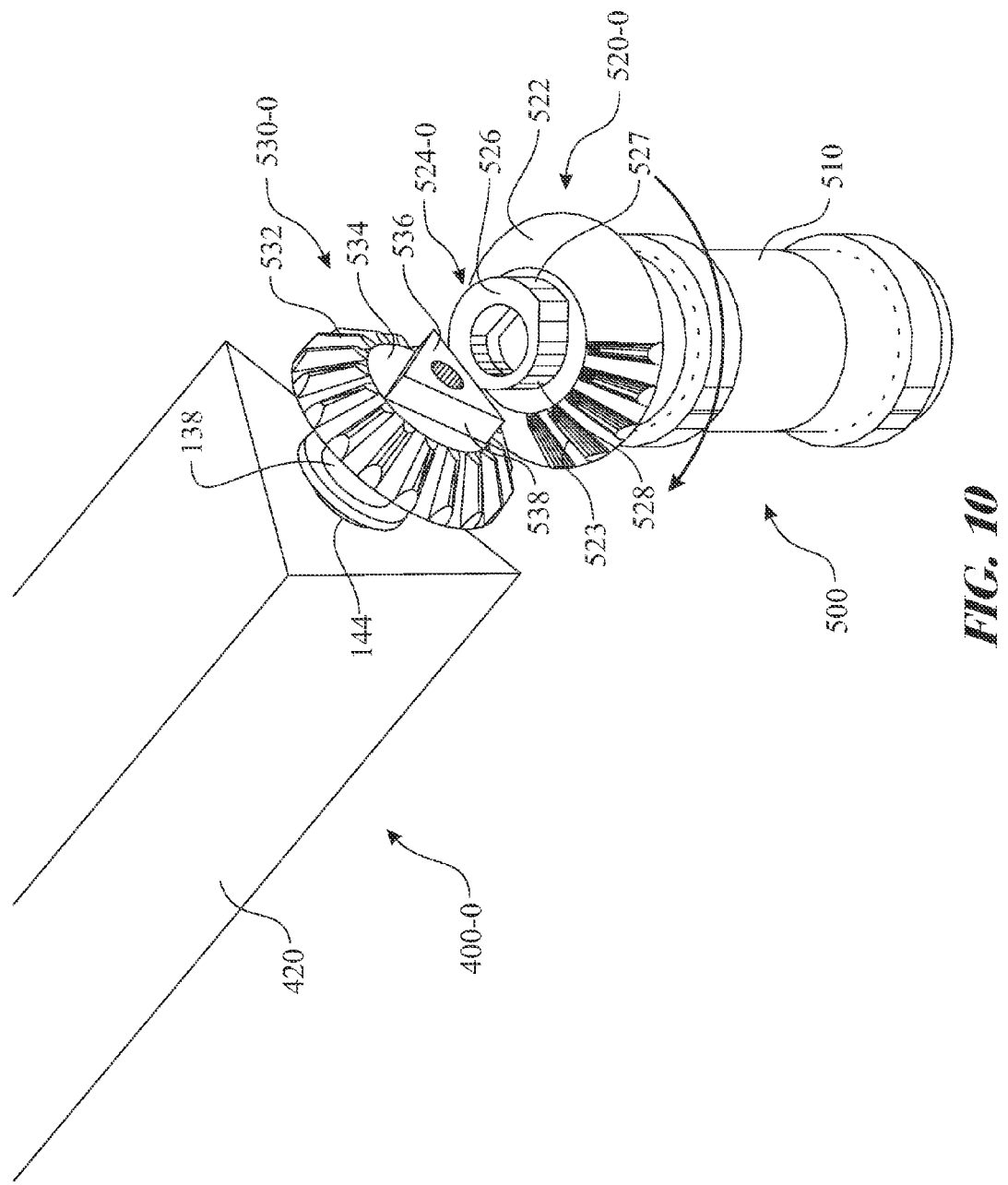
FIG. 10 illustrates a detailed isometric view of the alternate drive interface, positioned in a sustain first image presentation configuration.

A control circuit board 190 is preferably integrated into the multi-image license plate assembly 100 as illustrated in the exemplary embodiment shown in FIG. 8. The control circuit board 190 would include operational circuitry for controlling the operation of the multi-image license plate assembly 100. The control circuit board 190 is preferably in electrical communication with the power source introduced above. The control circuit board 190 can include a wireless signal receiving circuit 192 and a vibration sensor 194.

It is understood the operational control assembly 200 can be in signal communication with the multi-image license plate assembly 100 via a wireless transmission. The wireless signal receiving circuit 192 provides a wireless signal interface with an alternative wireless embodiment of the operational control assembly 200. In an embodiment utilizing a wireless operational control assembly 200, the system can include any of a variety of procedures to ensure the correct operational control assembly 200 is associated with the respective multi-image license plate assembly 100. The procedure for associating the wireless operational control assembly 200 with the wireless signal receiving circuit 192 can be accomplished using any process known by those skilled in the art. A first process can include integration of an electronic serial number (ESN) where the wireless signal receiving circuit 192 decodes the signal to determine the ESN and compares the ESN with the programmed ESN. If the signal includes the correct ESN, the circuitry directs the respective action accordingly. A second process can associate the wireless operational control assembly 200 with the wireless signal receiving circuit 192 by requesting a transmission from the wireless operational control assembly 200 within a predetermined timeframe and determining and storing a unique signal identifier. A third process can associate the wireless operational control assembly 200 with the wireless signal receiving circuit 192 by receiving a transmission from the wireless operational control assembly 200 within a predetermined timeframe from initialization and determining and storing a unique signal identifier.

The vibration sensor 194 can provide a device for detecting motion or vibration of the multi-image license plate assembly 100. This would identify when the vehicle in which the multi-image license plate assembly 100 is mounted to is moving. The determination that the multi-image license plate assembly 100 is subjected to motion can be used to selectively govern operation of the multi-image license plate assembly 100 to scenarios where the vehicle is in motion. In one embodiment, the vibration sensor 194 can be selected to sense engine vibration to determine when the combustion engine of the vehicle is running.

A voltage monitoring circuit can be integrated into the control circuit board 190 to monitor the voltage level of the power source. The control circuit board 190 can turn the multi-image license plate assembly 100 off when the control circuit board 190 determines that the voltage of the source power supply is equal to or below a predetermined acceptable voltage level.

The control circuit board 190 can be interfaced with the solar power converter 182. The solar power converter 182 can provide power to a power management circuit integrated into the control circuit board 190. The power management circuit can use power provided by the solar power converter 182 to charge the batteries 180 as needed. When the power management circuit determines that the batteries 180 are charged to capacity, the power management circuit would reduce or cease charging of the batteries 180.

The user would provide power to the multi-image license plate assembly 100 via the power button 204. The series of rotational member assemblies 400 of the multi-image license plate assembly 100 can be set to be rotated manually, via a factory preset timeframe, or via a programmable timer sequence. The user can direct the rotational member assembly 400 to rotate in a forward or reverse direction via a respective forward or reverse button of the rotational direction control 208. Sensors, software, lights, and the like can be incorporated to indicate the image being presented by the multi-image license plate assembly 100 via the position indicator 206. It is preferred that the operational control assembly 200 be affixed to a vehicle dashboard (not shown, but well understood). An optional motion sensing circuit can be incorporated, determining when the vehicle is stationary or moving. The circuit can additionally sense the status of the engine. The circuit determines when engine is off and/or the vehicle is stationary, and places the multi-image license plate assembly 100 into a sleep mode. The multi-image license plate assembly 100 re-initiates the rotation sequence when the circuit determines that the engine is running and/or the vehicle is in motion.

Figure 6:
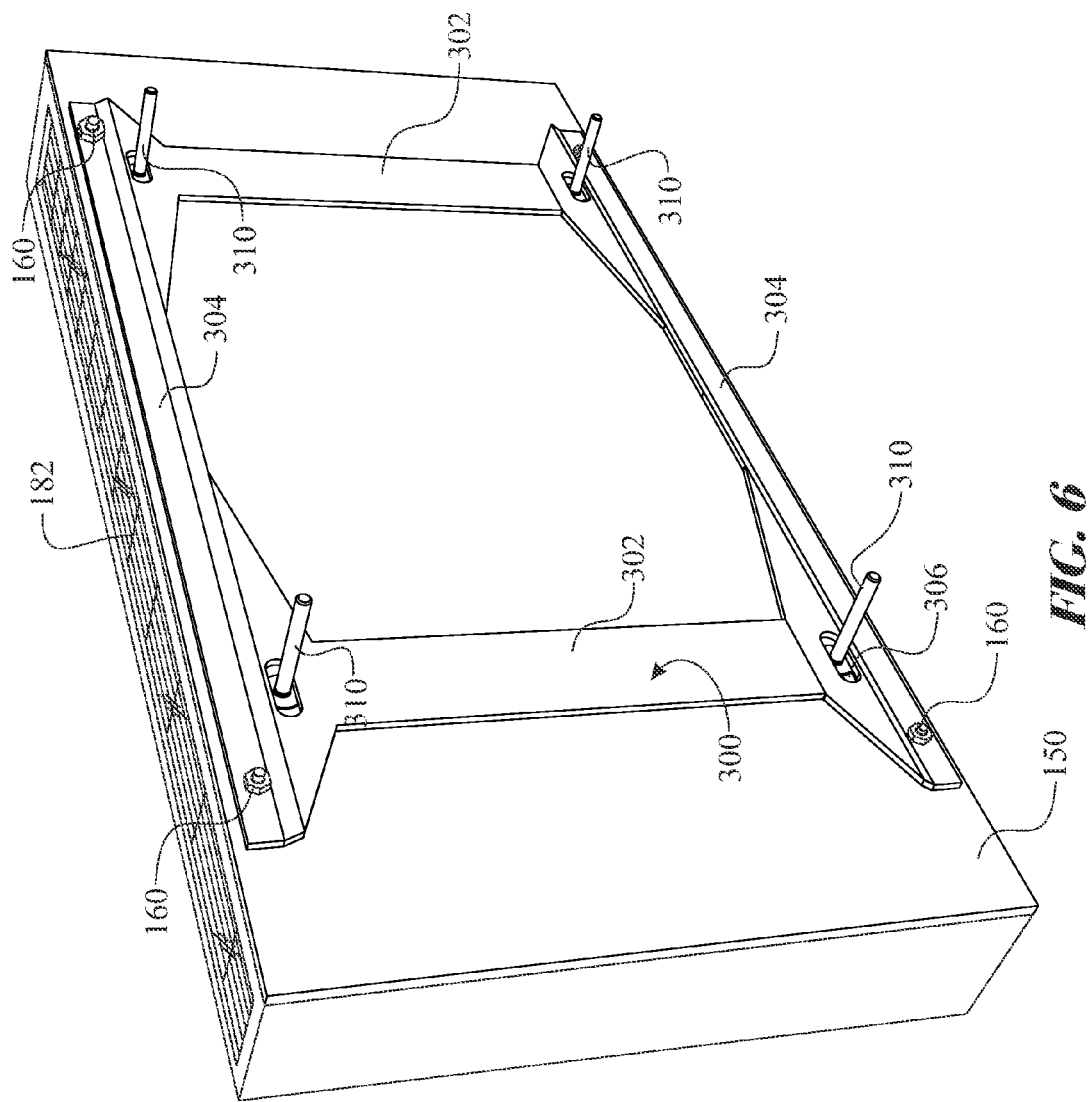
FIG. 6 illustrates a perspective rear view of an exemplary mounting frame and respective mounting hardware for mounting the multi-image license plate assembly to a vehicle.

A housing rear surface and mounting flange 150 is preferably formed about and extending laterally from the periphery of the inner frame 108 for mounting the inner frame 108 to a mounting frame assembly 300 as illustrated in FIG. 6. A plurality of housing mounting slot 152 (FIG. 4) can be disposed through the housing rear surface and mounting flange 150 providing clearance for a housing mounting fastener 160. The housing mounting fastener 160 is used to secure the housing rear surface and mounting flange 150 directly to the vehicle or to a mounting frame assembly 300 as illustrated in FIG. 6. The mounting frame assembly 300 provides an adapter between the multi-image license plate assembly 100 and the vehicle (not shown, but well understood). The mounting frame assembly 300 is preferably formed having a pair of vertical frame section 302 and a pair of horizontal frame section 304. The mounting frame assembly 300 includes a series of mounting frame fastener slot 306 mimicking the mounting configuration of a standard license plate. A mounting frame fastener 310 is inserted through each respective mounting frame fastener slot 306 for fastening the mounting frame assembly 300 to the vehicle. The assembly housing 102 is assembled to the inner frame 108 or housing rear surface and mounting flange 150 via any mechanical fastening system; preferably via a snap-lock feature, such as a tab that would insert into a plurality of front cover clip receptacles 106 (FIG. 4). If the assembly front cover 104 is separate from the assembly housing 102, the assembly front cover 104 is then assembled to the assembly housing 102. Alternately, the multi-image license plate assembly 100 can include an adaptive mounting form factor within the assembly housing 102 to directly mount the assembly 100 to the vehicle.

The fabrication cost is minimized by designing the components and assembly for manufacturability. The assembly housing 102 and assembly front cover 104 are formed of a molded plastic. The inner frame 108 is fabricated of a molded plastic, forming the rotational member shaft slot 142, front cover clip receptacles 106, housing rear surface and mounting flange 150, and other features within the shaft assembly supporting subsection 140 section of the inner frame 108. The rotational member assembly 400 is an assembly using components that are preferably fabricated of an extruded material and cut to length. The rotational display frame member 402, the rotational member axle 144, and the image insert 410 can all be fabricated using an extruding process. It is understood that the rotational member axle 144 can be fabricated separately by any axle manufacturing means, including extrusion, rolling, cold rolling, and the like. The rotational member axle 144 can be inserted through a tubular aperture located through the rotational display frame member 402. Alternately, a pair of short, rotational member axles 144 can be inserted into receptacles located at each end of the rotational display frame member 402. The gears 134, 136 can be fabricated using an extruding process, sheared to the desired thickness. Other components, such as the motor 130, the fasteners 160, 310, the rotational member gear shaft bushing 138, the wiring, and the like are preferably off the shelf components. Each can be fabricated of plastic, metal, or any other selected material. The assembly is generally insertion and snap fasteners.

It is recognized that although a series of gears 134, 136 are illustrated as a means for rotating the rotational member assembly 400, any number of rotation drive designs can be used. This includes a cable drive system, a chain drive system, a belt drive system, a worm gear drive system, a friction drive system, and the like.

A second such exemplary rotation drive design can be integrated as illustrated in FIGS. 8 through 16. The second exemplary embodiment utilizes a drive assembly 500. The drive assembly 500 includes a novel gear configuration comprising a motor segmented gear 520 driven by a drive motor 510, the motor segmented gear 520 engaging with a rotational member gear 530. The rotational member gear 530 is mechanically attached to the rotational member axle 144, which governs the rotated orientation of the rotational member assembly 400. The series of gears 134, 136, as previously described, maintain the rotational members 110, 112, 114, 116, 118 in rotational unison.

The sequence of a ⅓ rotation using the novel gear configuration 520, 530 is demonstrated in FIGS. 10 through 16. The rotational member assembly 400 rotates by 120 degrees (⅓ of a complete rotation), changing which of three images 420 are displayed, thus changing the displayed image. The motor segmented gear 520 engages with the rotational member gear 530 to rotate the rotational member assembly 400 in 120 degree increments. A drive gear rotational member stabilizing cam 524 is formed upon an axial end of the motor segmented gear 520. The drive gear rotational member stabilizing cam 524 engages with a three position display stabilizing cam 536 formed upon an axial end of the rotational member gear 530. The steps of motion of each of the motor segmented gear 520, drive gear rotational member stabilizing cam 524, rotational member gear 530, and rotational member assembly 400 are defined by a suffix.

The motor segmented gear 520 is fabricated having a drive gear toothed section 523 spanning approximately 120 degrees of the circumference of a conical surface of the motor segmented gear 520. A drive gear tooth-free section 522 is provided about the balance of the circumference of the motor segmented gear 520. A series of rotational member gear teeth 532 are spatially distributed about a circumference of a conical surface of the rotational member gear 530. The drive gear toothed section 523 periodically engage with the rotational member gear teeth 532 wherein engagement occurs during ⅓ of the rotation of drive motor 510 and the drive motor 510/motor segmented gear 520 rotates freely during ⅔ of the rotation of the drive motor 510. The illustrated design is provided for a three-sided object. It is understood the ratio of teeth to bare surface can vary respective to the number of sides to be displayed.

The drive gear rotational member stabilizing cam 524 is fabricated having a stabilizing surface 526, a stationary display broad radius cam section 527 and a display rotating narrow cam section 528. The ratio of the circumferential length of the stationary display broad radius cam section 527 to the display rotating narrow cam section 528 defines the time desired to stabilize the image 420 in a display orientation. The display rotating narrow cam section 528 is oriented to correspond with the drive gear tooth-free section 522. The three position display stabilizing cam 536 is shaped comprising three planar sidewall surfaces referred to as a stabilizing cam engaging edge surface 538, the number corresponding with the number of desired stop positions. It is understood that the number of planar sidewall surfaces 538 is respective to the number of sides of the rotational member assembly 400. The exemplary three-position display stabilizing cam 536 is formed in a triangular shape in the exemplary embodiment to correlate with the triangular shaped rotational member assembly 400. The stabilizing cam engaging edge surface 538 rides atop the stabilizing surface 526, stabilizing the rotational member assembly 400 in a display orientation. The stationary display broad radius cam section 527 is positioned under the three position display stabilizing cam 536, wherein a planar gear upper surface 534 of the rotational member gear 530 provides clearance for the three position display stabilizing cam 536 during rotation.

Figure 11:
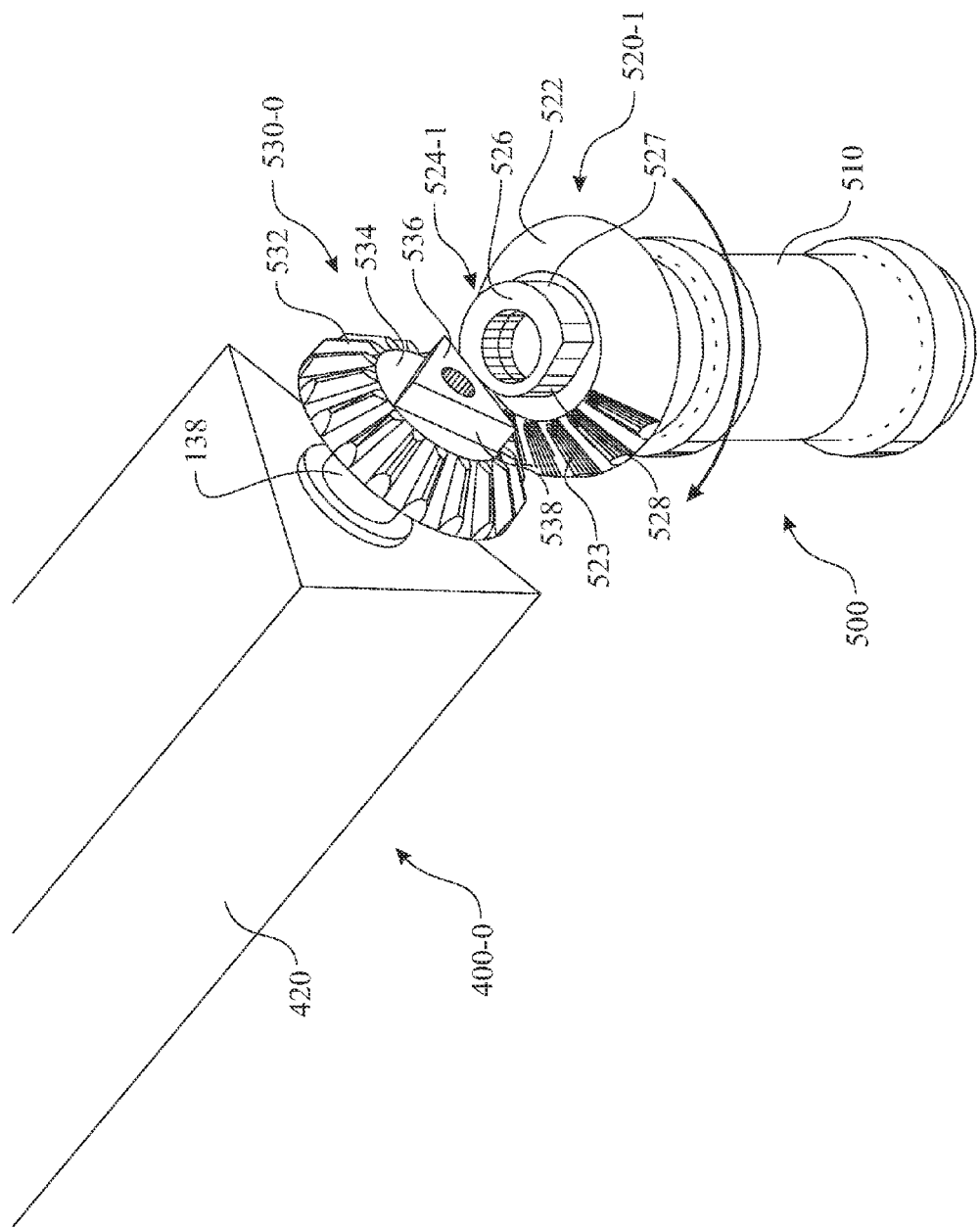
FIG. 11 illustrates a detailed isometric view of the alternate drive interface, positioned in a release sustain of the first image presentation configuration.
Figure 12:
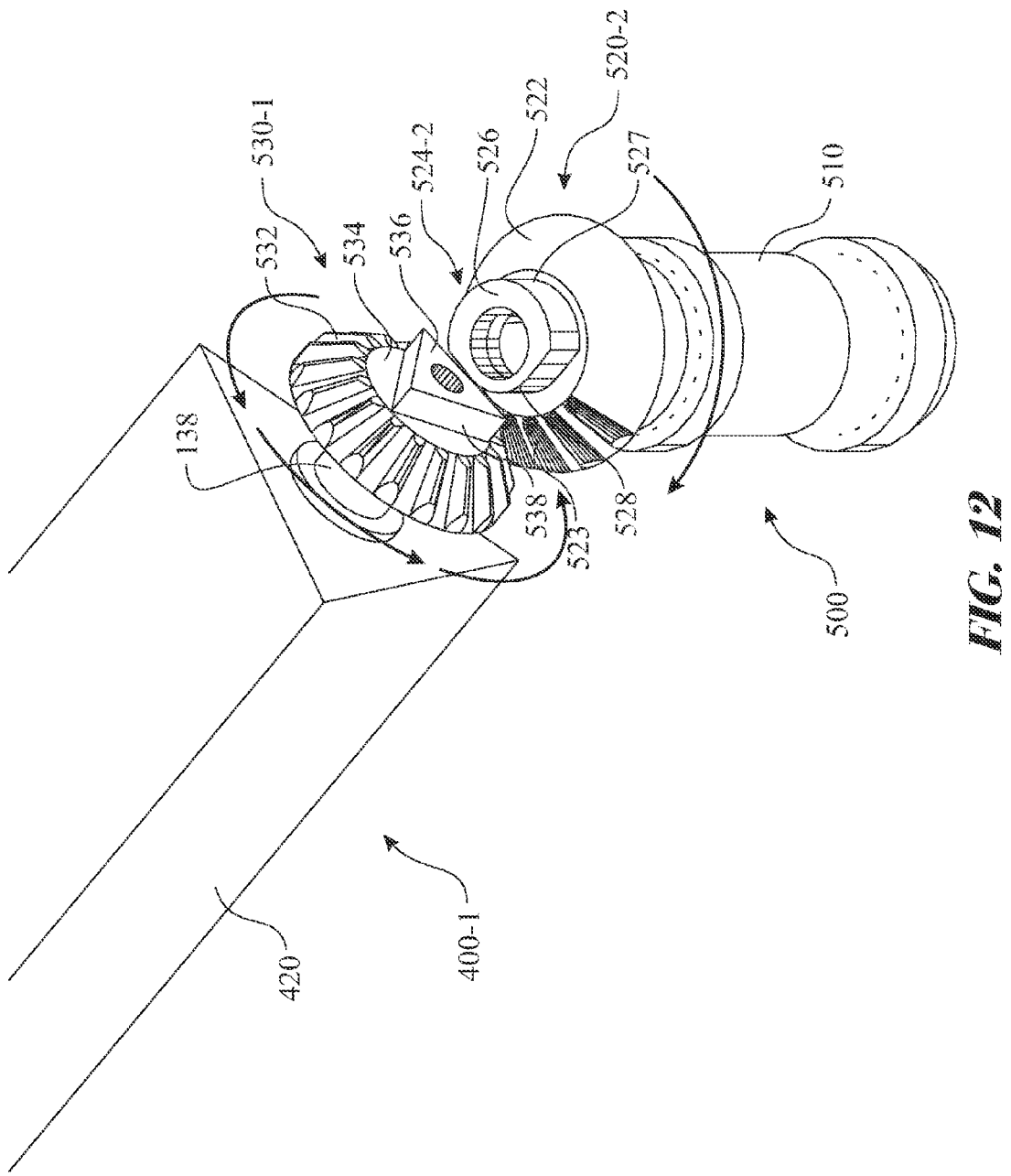
FIG. 12 illustrates a detailed isometric view of the alternate drive interface, positioned in a begin transition from the first image presentation configuration.
Figure 13:
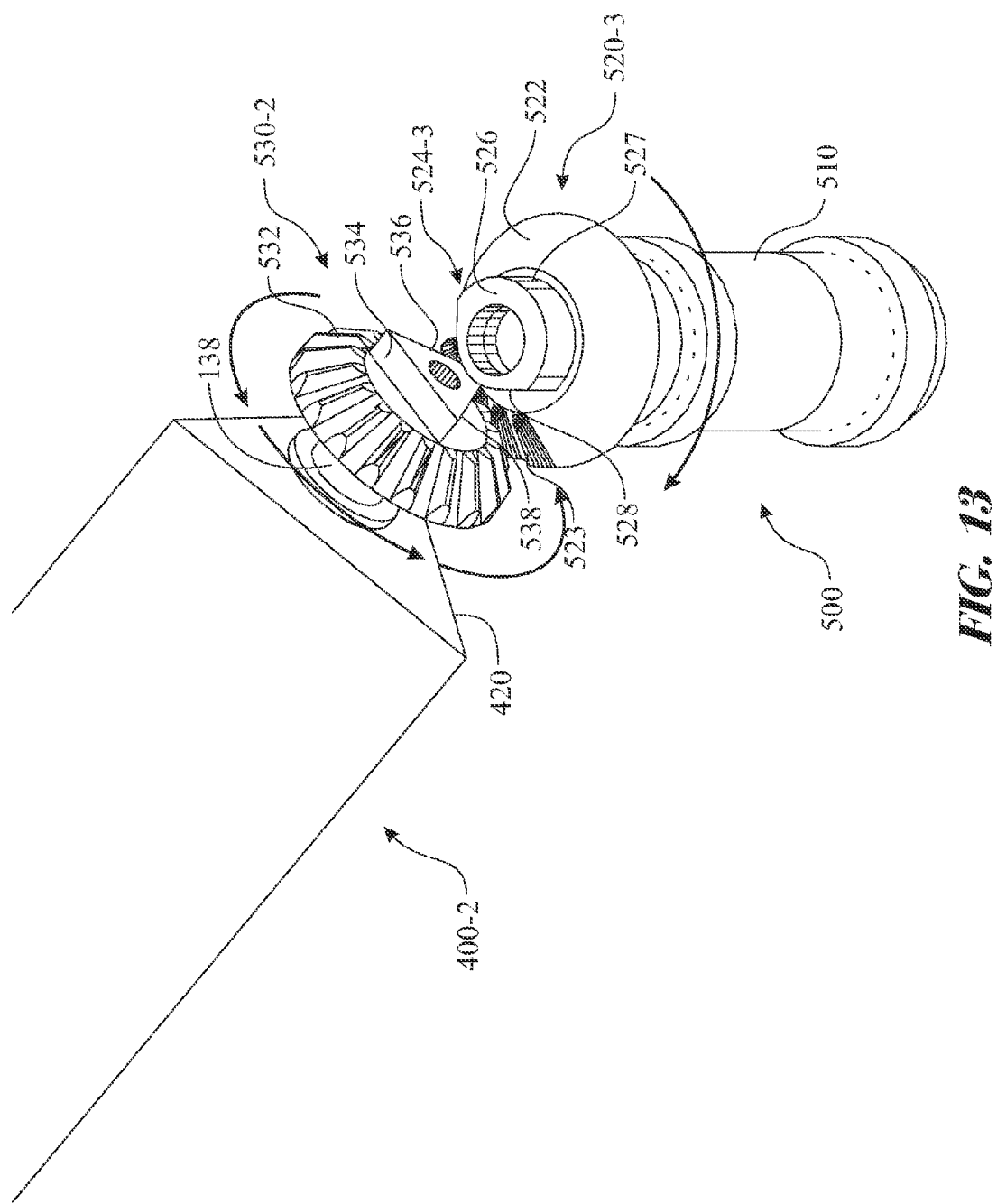
FIG. 13 illustrates a detailed isometric view of the alternate drive interface, positioned in a partially complete transition between the first image presentation configuration and a second image presentation configuration.
Figure 14:
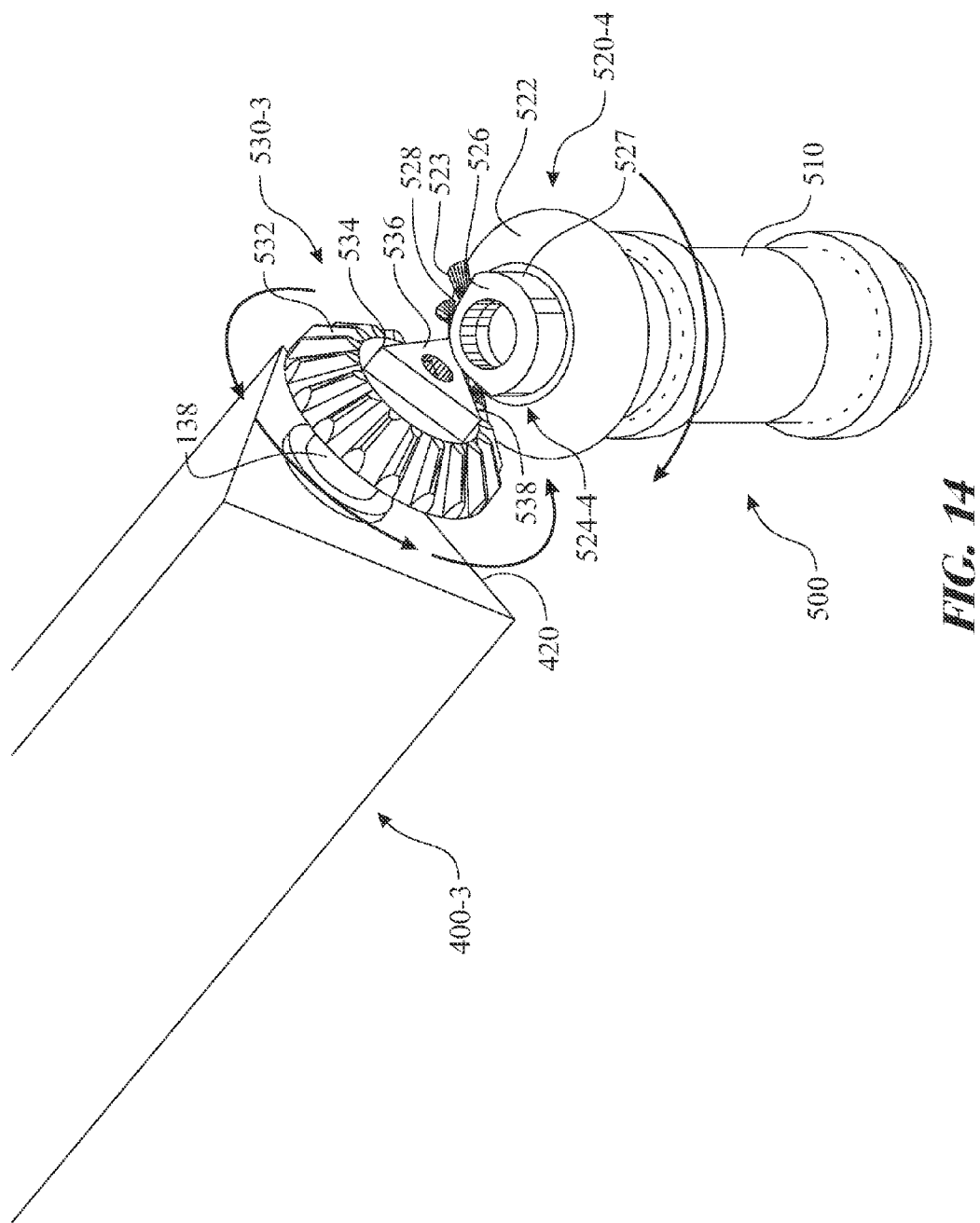
FIG. 14 illustrates a detailed isometric view of the alternate drive interface, positioned nearing completion of the transition between the first image presentation configuration and a second image presentation configuration.
Figure 15:
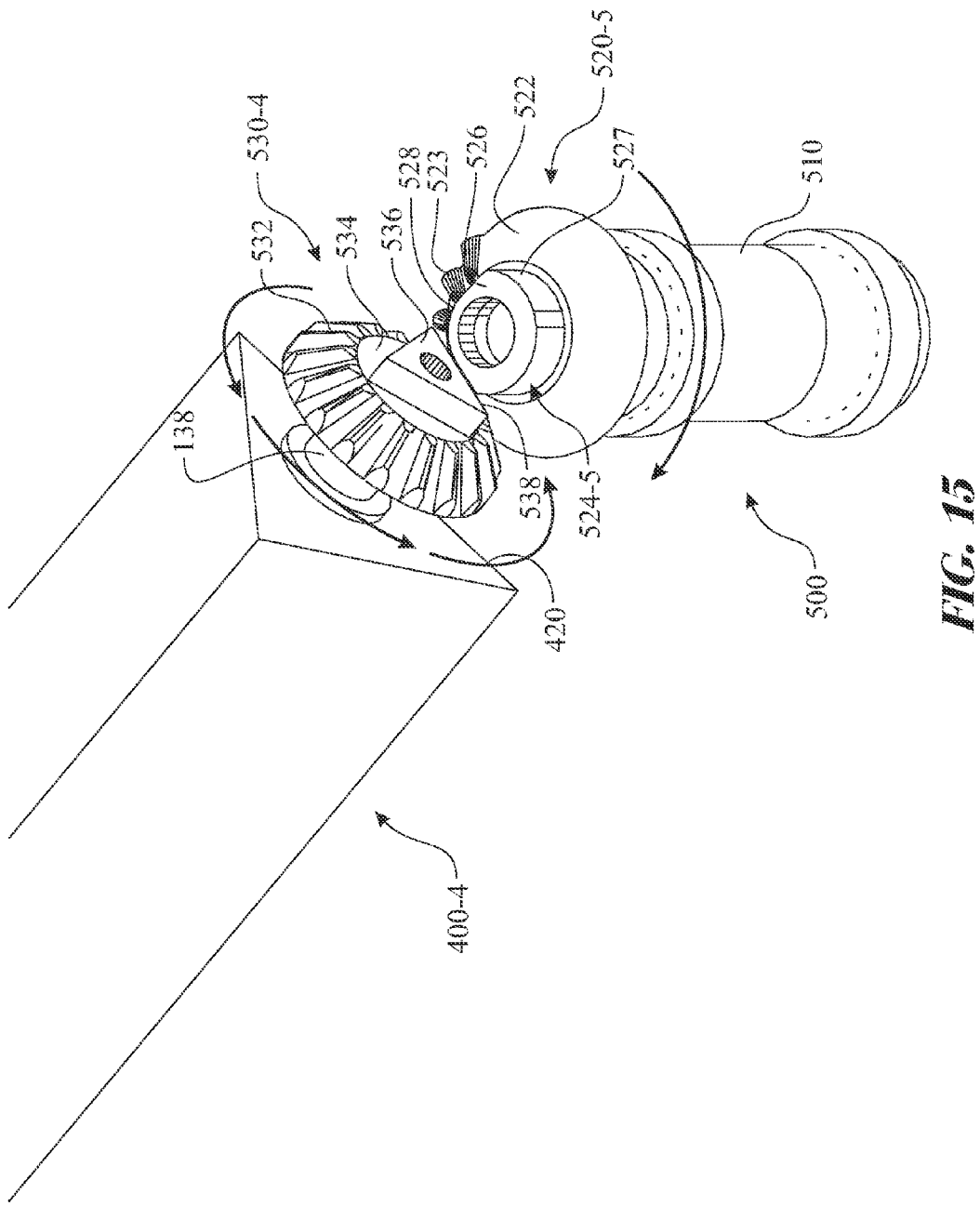
FIG. 15 illustrates a detailed isometric view of the alternate drive interface, positioned transitioning into a sustain second image presentation configuration.
Figure 16:
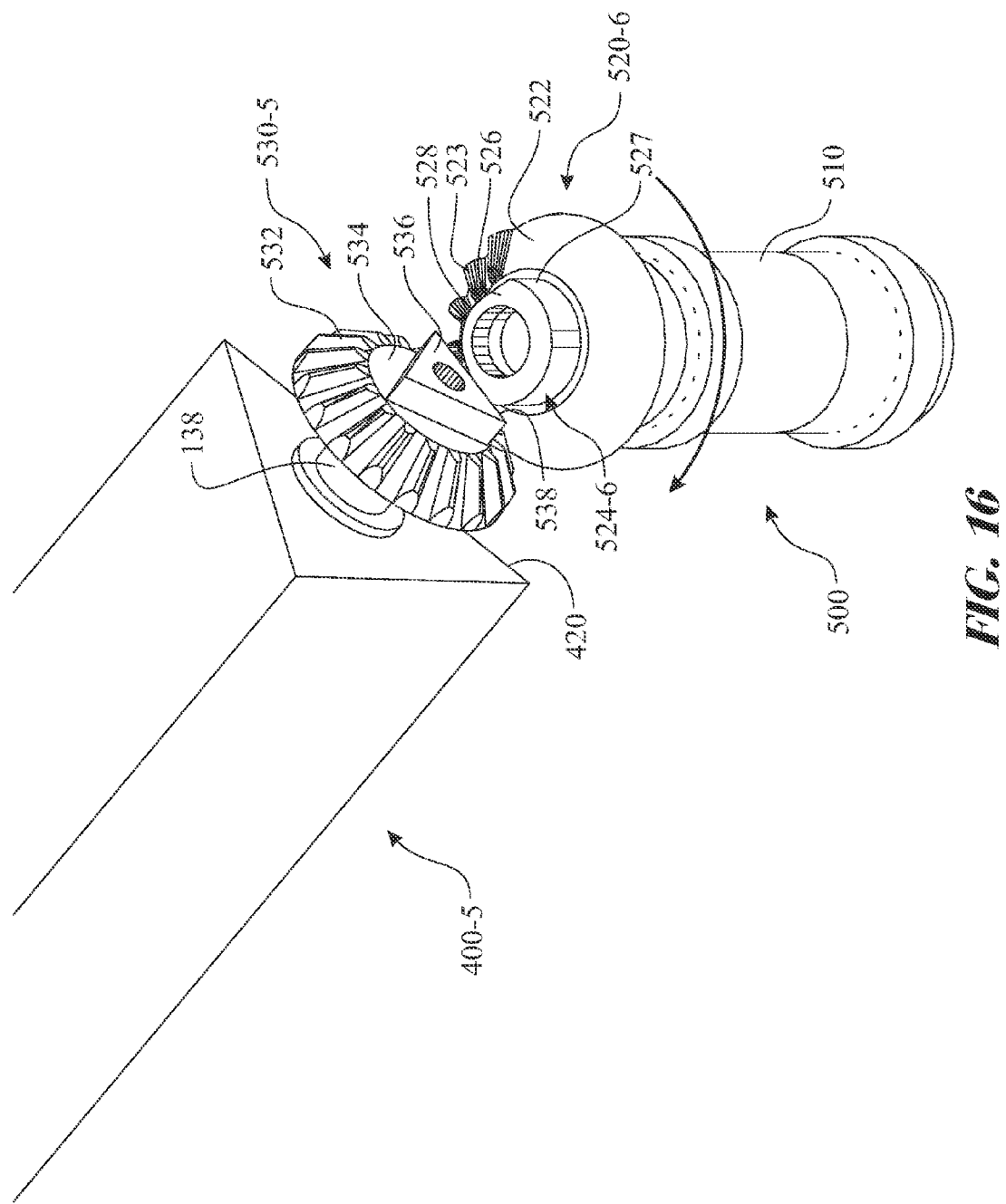
FIG. 16 illustrates a detailed isometric view of the alternate drive interface, positioned in the sustain second image presentation configuration.

The drive motor 510 rotates the motor segmented gear 520, which rotates the drive gear rotational member stabilizing cam 524 respectively. The stabilizing surface 526 of the drive gear rotational member stabilizing cam 524 supports and prevents the stabilizing cam engaging edge surface 538 from rotating. When the drive gear rotational member stabilizing cam 524 rotates to transition from the stationary display broad radius cam section 527 to the display rotating narrow cam section 528, the three position display stabilizing cam 536 begins to rotate. The positions are referenced as drive gear rotational member stabilizing cam 524-1, motor segmented gear 520-1, and rotational member gear 530-0 as illustrated in FIG. 11. The stabilizing cam engaging edge surface 538 transitions between a supported configuration and an unsupported configuration. Simultaneously, the drive gear toothed section 523 engages with the rotational member gear teeth 532 causing the rotational member gear 530 and respective rotational member assembly 400 to begin to rotate. The three position display stabilizing cam 536 rotates into the clearance provided by the display rotating narrow cam section 528. The position is referenced by the motor segmented gear 520-2/drive gear rotational member stabilizing cam 524-2 beginning to rotate the rotational member gear 530-1 which in turn rotates the rotational member assembly 400-1 via the rotational member axle 144 as illustrated in FIG. 12. The rotation continues as the drive gear toothed section 523 continues to engage with the rotational member gear teeth 532. The three position display stabilizing cam 536 passes across the display rotating narrow cam section 528. The position is referenced by the motor segmented gear 520-3/drive gear rotational member stabilizing cam 524-3 continuing to rotate the rotational member gear 530-2 which in turn rotates the rotational member assembly 400-2 as illustrated in FIG. 13. The rotation begins to transition into a second support position as the stationary display broad radius cam section 527 begins to reengage with the stabilizing cam engaging edge surface 538. The rotation of the motor segmented gear 520 approaches a position where the drive gear toothed section 523 are disengaging with the rotational member gear teeth 532. The position is referenced by the motor segmented gear 520-4/drive gear rotational member stabilizing cam 524-4 finalizing a rotation of the rotational member gear 530-3 which in turn rotates the rotational member assembly 400-3 as illustrated in FIG. 14. The rotation continues to transition into a second support position as the stabilizing cam engaging edge surface 538 seats upon the stabilizing surface 526. The rotation of the motor segmented gear 520 disengages the drive gear toothed section 523 from the rotational member gear teeth 532. The position is referenced by the motor segmented gear 520-5/drive gear rotational member stabilizing cam 524-5 finalizing a rotation of the rotational member gear 530-4 which in turn rotates the rotational member assembly 400-4 as illustrated in FIG. 15. The rotation finalizes the transition to a second support position. The rotation of the drive gear rotational member stabilizing cam 524 finalizes seating the stabilizing cam engaging edge surface 538 upon the stabilizing surface 526. The position is referenced by the motor segmented gear 520-6/drive gear rotational member stabilizing cam 524-6 completing a rotation of the rotational member gear 530-5 which in turn rotates the rotational member assembly 400-5 as illustrated in FIG. 16.

Figure 17:
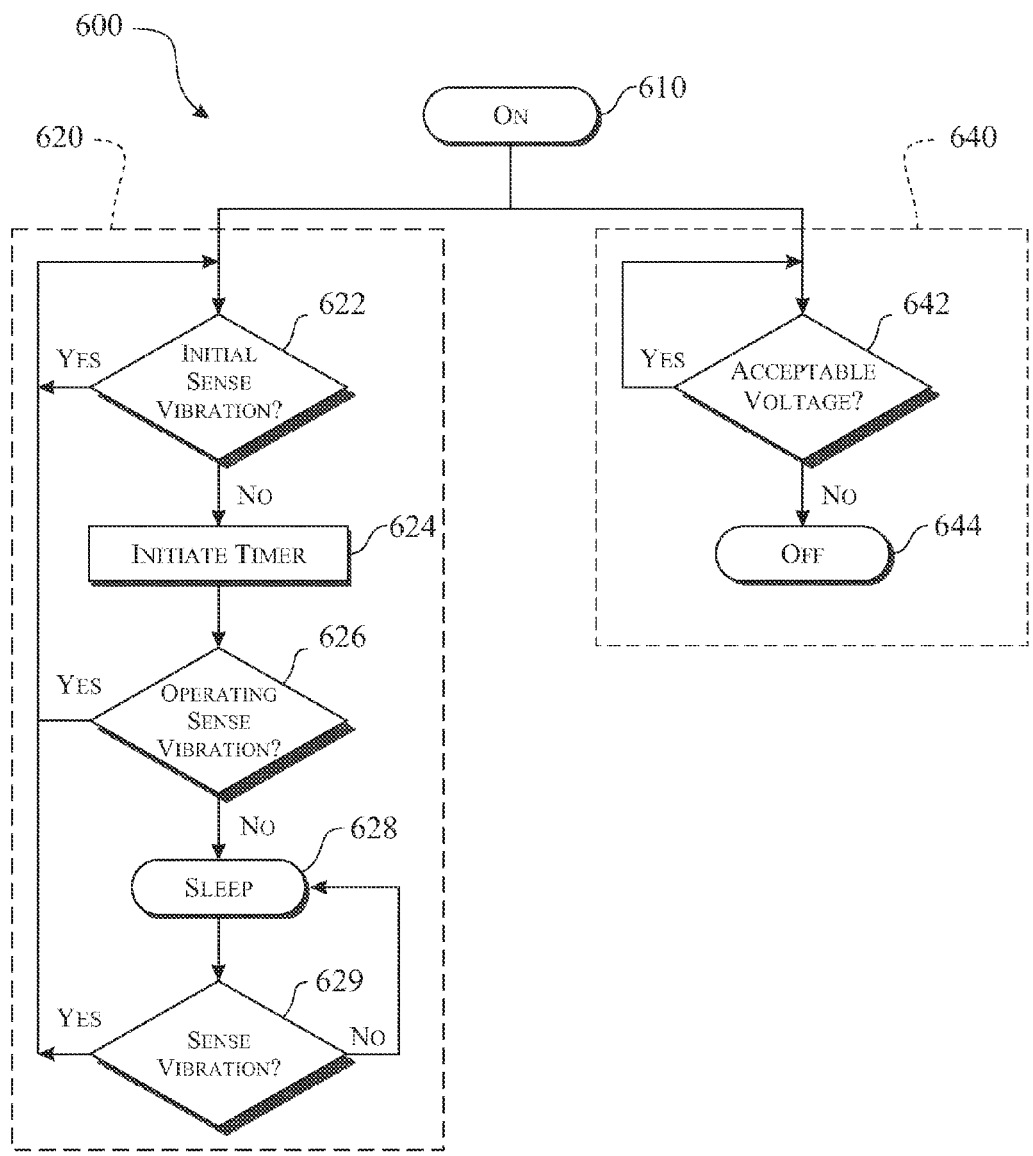
FIG. 17 presents an exemplary power consumption management flow diagram.

The multi-image license plate assembly 100 can include various circuits and respective digital operating instructions to manage operation of the multi-image license plate assembly 100 and respective power consumption. Examples of various circuits and respective digital operating instructions are presented in the exemplary power management circuit flow diagram 600 presented in FIG. 17. The exemplary power management circuit flow diagram 600 includes two power management monitoring sub-circuits, including a vibration based management system 620 and a source voltage based management system 640.

The vibration based management system 620 monitors exposure of the multi-image license plate assembly 100 to any vibrations. The vibration based management system 620 is provided to ensure the multi-image license plate assembly 100 only operates when the vehicle is in use, and preferably in motion. The vibration based management system 620 initiates when the multi-image license plate assembly 100 is activated (block 610). The system monitors for vibrations (decision block 622) using a vibration sensor 194. The multi-image license plate assembly 100 begins a rotational sequence upon sensing the initial vibration (block 622). Once the vibration sensor 194 identifies an initial vibration, the vibration based management system 620 continues to monitor the vibration sensor 194 to identify a subsequent vibration. During this time, the multi-image license plate assembly 100 continues to operate in accordance with the rotational sequence. A timer initiates (block 624) upon an instant when the vibration sensor 194 fails to identify a vibration. The vibration based management system 620 continues to monitor for any vibrations over the predetermined span of time (decision block 626) to determine if a subsequent vibration is identified. In a condition where the vibration based management system 620 identifies a vibration within the predetermined span of time, the vibration based management system 620 returns to the initial vibration sensing decision step 622 and the multi-image license plate assembly 100 continues to operate in accordance with the rotational sequence. In a condition where the vibration based management system 620 fails to identify a vibration within the predetermined span of time, the vibration based management system 620 places the multi-image license plate assembly 100 into a sleep mode (block 628) and the multi-image license plate assembly 100 ceases operation of the rotational sequence. The multi-image license plate assembly 100 is reactivated by a subsequent vibration (decision block 629). Upon sensing a subsequent vibration (decision block 629), the vibration based management system 620 returns to block 622.

The source voltage based management system 640 monitors the source voltage (decision block 642) to determine if the source voltage meets the predetermined minimum voltage. The system continues to operate in a condition where the source voltage meets the predetermined minimum voltage. In a condition where the source voltage fails to meet the predetermined minimum voltage, the source voltage based management system 640 deactivates the multi-image license plate assembly 100 (block 644) to conserve power. Reactivation of the multi-image license plate assembly 100 is preferably accomplished by depressing an activation or power button 204 on the operational control assembly 200.

Deviations from the disclosed teachings should still be considered as a component of the present invention. One exemplary deviation would be the orientation of the rotational members 110, 112, 114, 116, 118. Although the rotational members 110, 112, 114, 116, 118 are preferred to be oriented horizontally, the rotational members 110, 112, 114, 116, 118 can be provided in a vertical orientation.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method for changing an image of a license plate, the method comprising the steps of:

mounting a multi-image license plate assembly to a vehicle, said multi-image license plate assembly comprising:
an assembly frame having a viewing side and being sized approximate to a standard license plate,
a series of rotating display members comprising one drive rotating display member and a remaining members of said series of rotating display members being secondary rotating display members, said drive rotating display member having a drive rotational member axle disposed along a longitudinal center thereof and each secondary rotating display member having a respective secondary rotational member axle disposed along a longitudinal center thereof, wherein each said rotational member axle rotates about a respective rotational axis thereof,
each rotational member axle being rotationally assembled within said assembly frame enabling each rotating display member to rotate about said rotational axis,
each rotating member having a plurality of image surfaces, wherein a lower image surface edge of a first image surface abuts an upper image surface edge of an adjacent image surface to provide a planar surface finish,
a plurality of visual images, each visual image divided into segments with each segment disposed upon a respective image surface of said series of rotating display members, presenting said complete visual image when said rotating display members are rotationally positioned accordingly,
a rotational drive system; and
a mount for fastening said assembly frame to a license plate mount of a vehicle;
activating said multi-image license plate assembly;
rotating each of said rotating display members of said series of rotating display members about said rotational axis from a configuration orienting each first image surface of each of said rotating members in alignment to one another to form a first contiguous visual image to a configuration orienting each second image surface of each of said rotating members in alignment with one another to form a second contiguous visual image, wherein said rotating is accomplished in accordance with the following:
said rotational drive system driving a transmission subassembly, wherein said transmission subassembly generates a stepped rotational viewing sequential motion comprising a series of cyclical steps of rotating said drive rotational member and retaining said drive rotational member in a viewing position by way of a transmission subassembly; and
moving each rotating display member of said series of rotating display members in accordance with said stepped rotational viewing sequential motion by a series of torque translation gears, wherein each torque translation gear is located in rotational communication between two respective rotational member gears of two adjacent rotating display members, wherein said rotating motion is driven by said stepped rotational viewing sequential motion of said drive rotating display member and continues through interaction between said alternating series of torque translation gears and said rotational member gears.

2. A method for changing an image of a license plate as recited in claim 1, the method comprising the steps of:

sensing for a vibrational motion applied to said multi-image license plate assembly; and
maintaining operation of said multi-image license plate assembly as long as said vibrational motion is sensed within a predetermined period of time.

3. A method for changing an image of a license plate as recited in claim 1, the method comprising the steps of:
determining a voltage of a source power supply; and
ceasing operation of said multi-image license plate assembly when said source power supply voltage is at least one of equal to or below a predetermined voltage level.

4. A method for changing an image of a license plate as recited in claim 1, the method comprising the steps of:
manually directing operation of said multi-image license plate assembly via an operational control assembly; and
using said operational control assembly to control at least one of:
 i. activating said multi-image license plate assembly,
 ii. deactivating said multi-image license plate assembly,
 iii. directing a rotation of said series of rotating display members to sequentially advance said displayed image to a subsequent image,
 iv. controlling a direction of rotation of said series of rotating display members to sequentially advance said displayed image to a subsequent image in one of a clockwise rotation and a counterclockwise rotation,
 v. establishing a span of time between an automated sequential rotation of said series of rotating display members to sequentially advance said displayed image to a subsequent image, and
 vi. adjusting a span of time between an automated sequential rotation of said series of rotating display members to sequentially advance said displayed image to a subsequent image.

5. A method for changing an image of a license plate as recited in claim 1, the method comprising the steps of:
rotating one of said series of rotating display members by applying a torsion force from said rotational drive mechanism to one of:
 vii. a rotational member gear attached to a rotational axis of one of said series of rotating display members, and
 viii. a drive gear, wherein said drive gear is in rotational communication with said rotational member gear; and
rotating remaining members of said series of rotating display members by rotating a series of interacting gears, wherein said interacting gears comprise a torque translation gear located in rotational communication between two adjacent rotational member gear of two respective rotating display members.

6. A method for changing an image of a license plate as recited in claim 1, the method further comprising the step of:
powering said multi-image license plate assembly using a portable power supply, wherein said portable power supply is integrated as a component of said multi-image license plate assembly.

7. A method for changing an image of a license plate as recited in claim 6, the method further comprising the step of:
recharging said portable power supply by:
 collecting solar energy,
 converting solar energy to electrical energy, and
 communicating said solar generated electrical energy to said portable power supply.

8. A method for changing an image of a license plate, the method comprising the steps of:
mounting a multi-image license plate assembly to a vehicle, said multi-image license plate assembly comprising:
 an assembly frame having a viewing side and being sized approximate to a standard license plate,
 a series of rotating display members comprising a drive rotating display member and at least one secondary rotating display member, said drive rotating display member having a drive rotational member axle disposed along a longitudinal center thereof and each said at least one secondary rotating display member having a respective secondary rotational member axle disposed along a longitudinal center thereof, wherein each said rotational member axle rotates about a respective rotational axis thereof,
 each rotational member axle being rotationally assembled within said assembly frame enabling each rotating display member to rotate about said rotational axis,
 each rotating member having a plurality of image surfaces, wherein a lower image surface edge of a first image surface abuts an upper image surface edge of an adjacent image surface to provide a planar surface finish,
 a plurality of visual images, each visual image divided into segments with each segment disposed upon a respective image surface of said series of rotating display members, presenting said complete visual image when said rotating display members are rotationally positioned accordingly,
 a rotational drive mechanism,
 a motor segmented gear attached to a rotating shaft of said rotational drive mechanism, said motor segmented gear comprising a drive gear toothed section comprising a plurality of drive teeth provided in a spatial arrangement about a portion of a circumference of said motor segmented gear and a drive gear rotational member stabilizing cam extending axially from a distal end of said motor segmented gear, said drive gear rotational member stabilizing cam comprising a stabilizing surface, a stationary display broad radius cam section and a display rotating narrow cam section;
 a rotational member gear attached to a rotational axis of one rotating display member of said series of rotating display members, said rotational member gear comprising a plurality of rotational member gear teeth provided in a spatial arrangement about an entire circumference of said rotational member gear and a multi position display stabilizing cam extending axially from a distal end of said rotational member gear, said multi position display stabilizing cam comprising a series of stabilizing cam engaging edge surfaces collectively forming a peripheral edge thereof;
and
 a mount for fastening said assembly frame to a license plate mount of a vehicle;
activating said multi-image license plate assembly; and
rotating each of said rotating display members of said series of rotating display members about said rotational axis from a configuration orienting each first image surface of each of said rotating members in alignment to one another to form a first contiguous visual image to a configuration orienting each second image surface of each of said rotating members in alignment with one another to form a second contiguous visual image as follows:
operating said rotational drive mechanism to continuously rotate said motor segmented gear, said motor segmented gear rotates said drive gear toothed section to intermittently engage with said rotational member gear teeth, wherein when said drive gear toothed section engages with said rotational member gear teeth, said stabilizing cam engaging edge surface becomes aligned with said display rotating narrow cam section, said stabilizing cam engaging edge surface disengages from said stabilizing surface, enabling said respective rotational display member to rotate and said engagement causes said respective rotational display member to rotate about said rotational axis, and when said drive gear toothed section disengages with said rotational member gear teeth, said stabilizing cam engaging edge surface engages with said stabilizing surface to retain said respective rotational display member in a desired viewing orientation;

said rotational drive system driving a transmission subassembly, wherein said transmission subassembly generates a stepped rotational viewing sequential motion comprising a series of cyclical steps of rotating said drive rotational member and retaining said drive rotational member in a viewing position by way of a transmission subassembly; and moving each rotating display member of said series of rotating display members in accordance with said stepped rotational viewing sequential motion by a series of torque translation gears, wherein each torque translation gear is located in rotational communication between two respective rotational member gears of two adjacent rotating display members, wherein said rotating motion is driven by said stepped rotational viewing sequential motion of said drive rotating display member and continues through interaction between said alternating series of torque translation gears and said rotational member gears.

9. A method for changing an image of a license plate as recited in claim 8, the method comprising the steps of:
sensing for a vibrational motion applied to said multi-image license plate assembly; and
maintaining operation of said multi-image license plate assembly as long as said vibrational motion is sensed within a predetermined period of time.

10. A method for changing an image of a license plate as recited in claim 8, the method comprising the steps of:
determining a voltage of a source power supply; and
ceasing operation of said multi-image license plate assembly when said source power supply voltage is at least one of equal to or below a predetermined voltage level.

11. A method for changing an image of a license plate as recited in claim 8, the method comprising the steps of:
manually directing operation of said multi-image license plate assembly via an operational control assembly; and
using said operational control assembly to control at least one of:
ix. activating said multi-image license plate assembly,
x. deactivating said multi-image license plate assembly,
xi. directing a rotation of said series of rotating display members to sequentially advance said displayed image to a subsequent image,
xii. controlling a direction of rotation of said series of rotating display members to sequentially advance said displayed image to a subsequent image in one of a clockwise rotation and a counterclockwise rotation,
xiii. establishing a span of time between an automated sequential rotation of said series of rotating display members to sequentially advance said displayed image to a subsequent image, and
xiv. adjusting a span of time between an automated sequential rotation of said series of rotating display members to sequentially advance said displayed image to a subsequent image.

12. A method for changing an image of a license plate as recited in claim 8, the method comprising the steps of:
rotating said remaining members of said series of rotating display members by rotating a series of interacting gears, wherein said interacting gears comprise a torque translation gear located in rotational communication between two adjacent rotational member gears of two respective rotating display members, wherein each rotational member gear is attached to a rotational axis of one of said series of rotating display members.

13. A method for changing an image of a license plate as recited in claim 8, the method further comprising the step of:
powering said multi-image license plate assembly using a portable power supply, wherein said portable power supply is integrated as a component of said multi-image license plate assembly.

14. A method for changing an image of a license plate as recited in claim 13, the method further comprising the step of:
recharging said portable power supply by:
collecting solar energy,
converting solar energy to electrical energy, and
communicating said solar generated electrical energy to said portable power supply.

15. A method for changing an image of a license plate, the method comprising the steps of:
mounting a multi-image license plate assembly to a vehicle, said multi-image license plate assembly comprising:
an assembly frame having a viewing side and being sized approximate to a standard license plate,
a series of rotating display members, each rotating display member having a rotational axis disposed along a longitudinal center of each rotating display member,
each rotating display member comprising one drive rotating display member and a remaining members of said series of rotating display members being secondary rotating display members, said drive rotating display member having a drive rotational member axle disposed along a longitudinal center thereof and each secondary rotating display member having a respective secondary rotational member axle disposed along a longitudinal center thereof, wherein each said rotational member axle rotates about a respective rotational axis thereof,
each rotational member axle being rotationally assembled within said assembly frame enabling each rotating display member to rotate about said rotational axis,
each rotating member having a plurality of image surfaces, wherein a lower image surface edge of a first image surface abuts an upper image surface edge of an adjacent image surface to provide a planar surface finish,
a plurality of visual images, each visual image divided into segments with each segment disposed upon a respective image surface of said series of rotating display members, presenting said complete visual image when said rotating display members are rotationally positioned accordingly,
a rotational drive system; and
a control circuit comprising a vibration sensor; and
a mount for fastening said assembly frame to a license plate mount of a vehicle;

activating said multi-image license plate assembly;

controlling said activation of said multi-image license plate assembly by an association with at least one vibration identified by said vibration sensor; and rotating said images in accordance with the following:

said rotational drive system drives a transmission subassembly, wherein said transmission subassembly generates a stepped rotational viewing sequential motion comprising a series of cyclical steps of rotating said drive rotational member and retaining said drive rotational member in a viewing position by way of a transmission subassembly; and moving each rotating display member of said series of rotating display members in accordance with said stepped rotational viewing sequential motion by a series of torque translation gears, wherein each torque translation gear is located in rotational communication between two respective rotational member gears of two adjacent rotating display members, wherein said rotating motion is driven by said stepped rotational viewing sequential motion of said drive rotating display member and continues through interaction between said alternating series of torque translation gears and said rotational member gears, wherein said vibration based management system fails to identify a vibration within a predetermined span of time, said vibration based management system places said multi-image license plate assembly into a sleep mode and said multi-image license plate assembly ceases operation of said rotational sequence.

16. method for changing an image of a license plate as recited in claim 15, the method comprising the steps of:

maintaining operation of said multi-image license plate assembly as long as said vibrational motion is sensed within a predetermined period of time.

17. A method for changing an image of a license plate as recited in claim 15, the method comprising the steps of:

determining a voltage of a source power supply; and ceasing operation of said multi-image license plate assembly when said source power supply voltage is at least one of equal to or below a predetermined voltage level.

18. A method for changing an image of a license plate as recited in claim 1, the method comprising the steps of:

manually directing operation of said multi-image license plate assembly via an operational control assembly; and using said operational control assembly to control at least one of:

xv. activating said multi-image license plate assembly, xvi. deactivating said multi-image license plate assembly, xvii. directing a rotation of said series of rotating display members to sequentially advance said displayed image to a subsequent image, xviii. controlling a direction of rotation of said series of rotating display members to sequentially advance said displayed image to a subsequent image in one of a clockwise rotation and a counterclockwise rotation, xix. establishing a span of time between an automated sequential rotation of said series of rotating display members to sequentially advance said displayed image to a subsequent image, and xx. adjusting a span of time between an automated sequential rotation of said series of rotating display members to sequentially advance said displayed image to a subsequent image.

19. A method for changing an image of a license plate as recited in claim 15, the method comprising the steps of:

rotating one of said series of rotating display members by applying a torsion force from said rotational drive mechanism to one of:

xxi. a rotational member gear attached to a rotational axis of one of said series of rotating display members, and xxii. a drive gear, wherein said drive gear is in rotational communication with said rotational member gear; and rotating remaining members of said series of rotating display members by rotating a series of interacting gears, wherein said interacting gears comprise a torque translation gear located in rotational communication between two adjacent rotational member gear of two respective rotating display members.

20. A method for changing an image of a license plate as recited in claim 15, the method further comprising the step of:

powering said multi-image license plate assembly using a portable power supply, wherein said portable power supply is integrated as a component of said multi-image license plate assembly.

21. A method for changing an image of a license plate as recited in claim 20, the method further comprising the step of:

recharging said portable power supply by:

collecting solar energy, converting solar energy to electrical energy, and communicating said solar generated electrical energy to said portable power supply.

\* \* \* \* \*